United States Patent
Dhanapal et al.

(10) Patent No.: US 10,674,381 B2
(45) Date of Patent: Jun. 2, 2020

(54) ADAPTIVE PRIORITIZATION OF UNICAST AND MULTICAST DATA TRANSFER BASED ON TRAFFIC CLASSES

(71) Applicant: Apple Inc., Cupertino, CA (US)

(72) Inventors: Muthukumaran Dhanapal, Dublin, CA (US); Vijay Venkataraman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/223,973

(22) Filed: Dec. 18, 2018

(65) Prior Publication Data

US 2019/0253902 A1 Aug. 15, 2019

Related U.S. Application Data

(60) Provisional application No. 62/630,647, filed on Feb. 14, 2018.

(51) Int. Cl.
| | |
|---|---|
| *H04W 24/02* | (2009.01) |
| *H04W 48/18* | (2009.01) |
| *H04W 28/02* | (2009.01) |
| *H04W 4/06* | (2009.01) |
| *H04L 5/00* | (2006.01) |
| *H04W 36/00* | (2009.01) |

(52) U.S. Cl.
CPC ............ *H04W 24/02* (2013.01); *H04L 5/001* (2013.01); *H04W 4/06* (2013.01); *H04W 28/0231* (2013.01); *H04W 36/0007* (2018.08); *H04W 48/18* (2013.01)

(58) Field of Classification Search
CPC ... H04W 24/02; H04W 36/0007; H04W 4/06; H04W 28/0231; H04W 48/18; H04W 40/023; H04W 4/48; H04L 5/001; H04L 5/0044; H04L 5/0064; H04L 5/0098
See application file for complete search history.

(56) References Cited

U.S. PATENT DOCUMENTS

| | | | |
|---|---|---|---|
| 5,898,687 A * | 4/1999 | Harriman | ............ H04L 12/5601 370/389 |
| 9,532,262 B2 | 12/2016 | Worrell | |
| 10,021,709 B2 | 7/2018 | Kim | |
| 2007/0248082 A1 | 10/2007 | Nielsen | |

(Continued)

FOREIGN PATENT DOCUMENTS

EP 2 763 036 B1 1/2018

*Primary Examiner* — Ricky Q Ngo
*Assistant Examiner* — Kabir U Jahangir
(74) *Attorney, Agent, or Firm* — Kowert, Hood, Munyon, Rankin & Goetzel, P.C.

(57) ABSTRACT

A network controller, a user equipment (UE) device, and associated methods for adaptively prioritizing simultaneous unicast and multicast communications based on traffic classes. The UE may determine whether each of a unicast communication and a multicast communication are associated with a foreground application or a background application. The UE may further determine whether each of the unicast communication and the multicast communication are high priority or low priority. The UE may then buffer one of the unicast or multicast communications based on the whether it is associated with a foreground or background application, whether it is high or low priority, and whether it is a unicast or multicast communication.

20 Claims, 7 Drawing Sheets

(56) References Cited

U.S. PATENT DOCUMENTS

2009/0028127 A1    1/2009  Walker
2016/0021516 A1*   1/2016  Han .................... H04W 4/06
                                                   370/312

* cited by examiner

| Traffic pattern for Unicast | Traffic pattern for Multicast | Example | Preference |
|---|---|---|---|
| Foreground High Priority | Background Low Priority | User initiated a voice call on unicast, SW update procedure on multicast | Unicast |
| Foreground Low Priority | Background Low Priority | User is sending an iMessage on unicast, SW update on multicast | Unicast |
| Foreground High Priority | Foreground High Priority | When Super Bowl streaming going on multicast, User initiated Face Time call on unicast | Unicast |
| Foreground Low Priority | Foreground High Priority | Mail data is being sent; Super Bowl streaming going over multicast | Multicast, also multicast will be scheduled over higher BW carrier |
| Foreground Low Priority | Foreground Low Priority | User initiates Mail app. File down load over multicast | Unicast |
| Foreground High Priority | Foreground Low Priority | User initiates Facetime on unicast; Weather information multicast | Unicast |
| Background Low Priority | Foreground High Priority | Stocks app refresh on unicast, Super Bowl streaming going on multicast | Multicast, also multicast will be scheduled over higher BW carrier |
| Background High Priority | Foreground High Priority | Super Bowl streaming going on multicast; Music streaming on unicast | Multicast, also multicast will be scheduled over higher BW carrier |
| Background Low Priority | Foreground Low Priority | Stocks app refresh on unicast, news stream over multicast | Multicast, also multicast will be scheduled over higher BW carrier |
| Background High Priority | Foreground Low Priority | Music streaming over unicast; File download over multicast (eg: movie) | Unicast |
| Background Low Priority | Background Low Priority | Stocks app refresh; SW update on multicast | Multicast, also multicast will be scheduled over higher BW carrier |

FIG. 7

ADAPTIVE PRIORITIZATION OF UNICAST AND MULTICAST DATA TRANSFER BASED ON TRAFFIC CLASSES

PRIORITY INFORMATION

This application claims priority to U.S. provisional patent application Ser. No. 62/630,647, entitled "Adaptive Prioritization of Unicast and Multicast Data Transfer Based on Traffic Classes", filed Feb. 14, 2018, which is hereby incorporated by reference in its entirety as though fully and completely set forth herein.

FIELD

The present disclosure relates to wireless communication, and more particularly to combined multicast and unicast communication in wireless systems.

DESCRIPTION OF THE RELATED ART

Multicast communication refers to communication of information from a sender to a group (e.g., a "multicast group") of destinations simultaneously. In contrast, unicast communication refers to communication of information for a sender to a single receiver. While many wireless systems include some mechanisms for performing both multicast and unicast communication, such mechanisms are sometimes subject to limitations with respect to their reliability, efficiency, and/or other attributes. Accordingly, improvements in this domain would be desirable.

SUMMARY

This document describes, inter alia, methods for wireless devices and network infrastructure related to the concurrent performance of unicast and multicast communication, and describes wireless devices and network infrastructure configured to implement the described methods.

In some embodiments, a user equipment device (UE) is configured to perform adaptive prioritization of unicast and multicast data transfer based on traffic classes. The UE device may determine that one of a unicast or multicast communication is prioritized (i.e., preferred) based on whether they each are of high priority or low priority, and whether they are associated with an application running in the foreground or background. Multicast communications may generally refer herein to any combination of broadcast communications and/or multicast communications, such as multimedia broadcast multicast services (MBMS), or enhanced MBMS (eMBMS), among other possibilities.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which:

FIG. 7 is a table illustrating specific cases and examples when either a unicast or multicast communication is prioritized, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station (such as an evolved node B, or eNB, for example) installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 1:
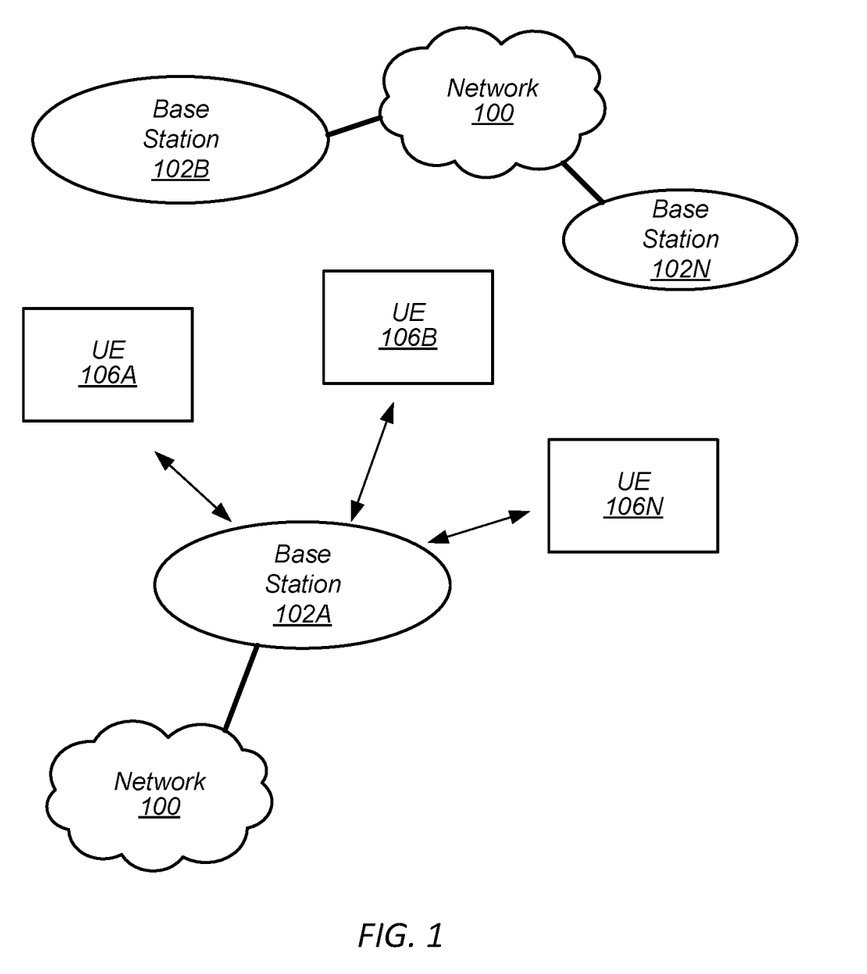
FIG. 1 illustrates an exemplary (and simplified) wireless communication system, according to some embodiments.
Figure 2:
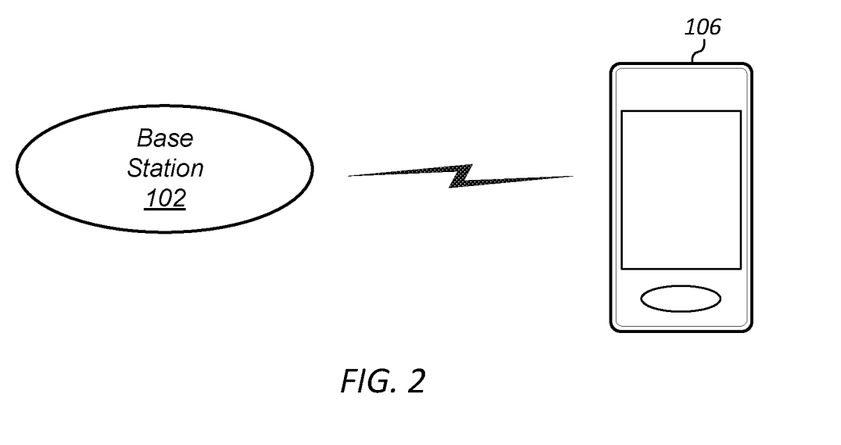
FIG. 2 illustrates an exemplary user equipment (UE) in communication with an exemplary base station, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

In various embodiments, the base station 102A may be configured to communicate with separate UEs 106A-106N through dedicated UE-specific communication channels, or 'unicast' communications. Additionally or alternatively, the base station 102A may be configured to communicate with multiple ones of the UEs 106A-106N through a common broadcast and/or multicast communication channel, wherein a single broadcast and/or multicast transmission is received by each of a plurality of UEs.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
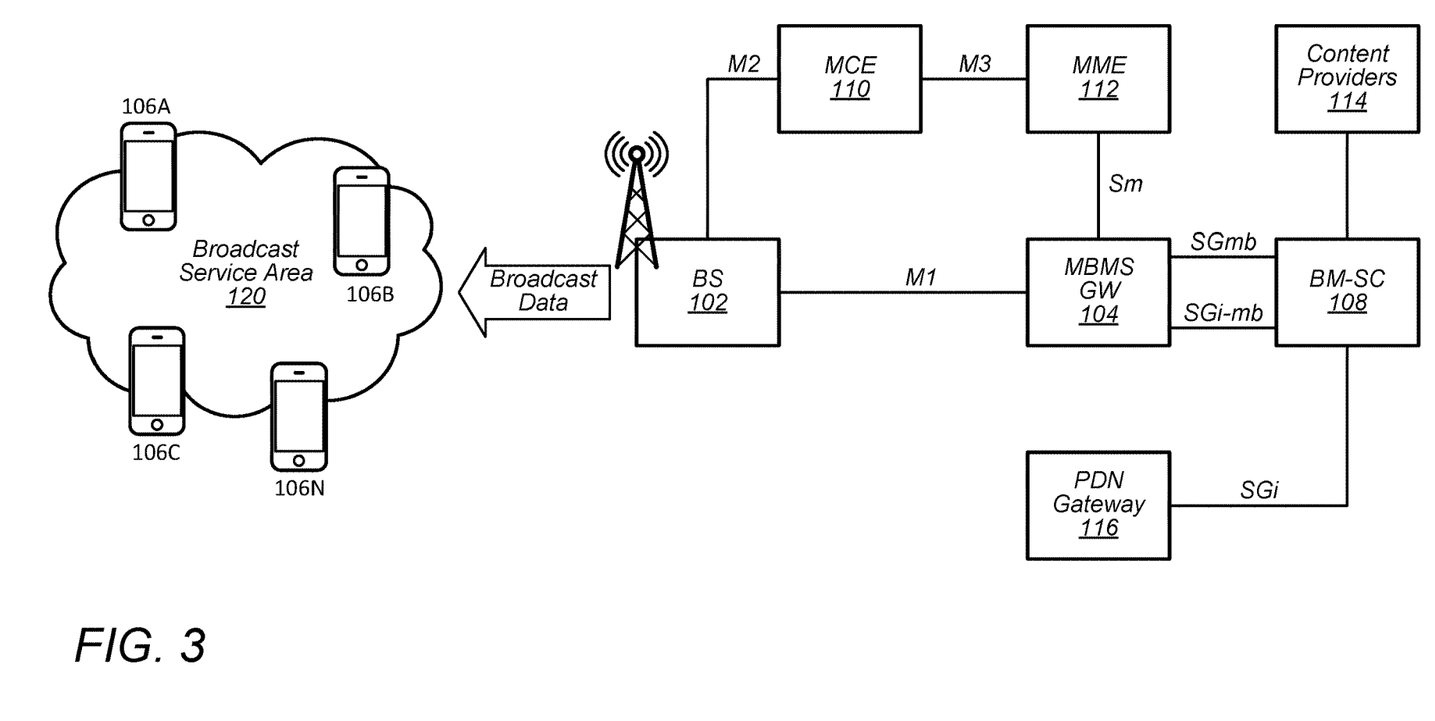
FIG. 3 illustrates an example simplified wireless communication system configured to conduct enhanced multimedia broadcast multicast services (eMBMS), according to some embodiments.

FIG. 3—Wireless Unicast/Multicast Communication System

FIG. 3 illustrates a simplified wireless communication system configure to adaptively prioritize simultaneous unicast and multicast communications, according to some embodiments. In FIG. 3, the BS 102, MME 112, content provider 114, and PDN gateway 116 represent network infrastructure that is standard for typical wireless communication protocols. In contrast, the MCE 110, MBMS GW 104, and BM-SC 108 represent additional components that are introduced for multicast communications, such as enhanced multimedia broadcast multicast services (eMBMS).

As illustrated, a plurality of UEs 106A-106N may be in a broadcast service area 120 of base station 102, which may be an evolved Node B (eNB) in some embodiments. The BS 102 may be communicatively coupled to a multimedia broadcast multicast multimedia services gateway (MBMS GW) 104 through an M1 interface. The MBMS GW 104 may be connected to multiple BSs 102A-102N (not shown) for distribution of data for eMBMS broadcasting. The MBMS GW 104 may broadcast all data packets intended for eMBMS broadcasting to the BSs within a service area, and the MBMS GW may additionally direct session management (e.g., through Session Start and Session Stop directions). In some embodiments, the M1 interface makes use of an internet protocol (IP) multicast protocol for the delivery of data packets to BSs. The BS may additionally be communicatively coupled to a multicast coordination entity (MCE) 110 through an M2 interface. The MCE 110 may be responsible for allocation of time and frequency resources for eMBMS transmissions. The MCE 110 may perform the scheduling on the radio interface, and the MCE 110 may be a logical node which may be integrated as part of the BS, or may be a separate device. The M2 interface may be used by the MCE 110 to provide the BS 102 with radio configuration information. The MCE 110 may allocate radio resources used by eNBs in the same broadcast area, and may configure subframes for eMBMS control and data broadcast. The MCE 100 may further ensure that the L2/L3 layers in eNBs are well configured for eMBMS operation. The MCE 110 may be communicatively coupled to a mobile management entity (MME) 112 through an M3 interface. The M3 interface may support eMBMS session control signaling (e.g., for session initiation and termination).

As illustrated, the MBMS GW 104 may be communicatively coupled to a broadcast multicast service center (BM-SC) 108 through each of a SGmb and a SGi-mb interface. The BM-SC 108 may serve as an entry point for content providers and/or other sources of eMBMS data packets, which are external to the network. For example, the BM-SC 108 may serve to authenticate terminals requesting activation of an eMBMS service. The BM-SC 108 may be further configured to implement intelligent broadcast and/or multicast services, according to some embodiments. The SGmb interface may support signaling procedures between the BM-SC 108 and the MBMS GW 104, including eMBMS bearer signaling for setting up and releasing context at eMBMS session establishment and termination. The SGi-mb interface may support the eMBMS traffic plane (i.e., the transfer of eMBMS data packages). As illustrated, the BM-SC 108 may be communicatively coupled to various content providers 114 (e.g., a content provider server), and may further be coupled to a packet data network (PDN) gateway 116 via an SGi interface. The BM-SC 108 may be configured to implement embodiments described herein, and may more generically be referred to as a 'network controller'. In other embodiments, 'network controller' may refer more generally to combinations of network components described in FIG. 3. For example, 'network controller' may refer to any combination of the BM-SC 108, the Content Providers 114, the MBMS GW 104, the MME 112, the MCE 110, the PDN Gateway 116, and/or the BS 102.

In various embodiments, some or all of the network components of FIG. 3 (e.g., the BS, MCE, MME, MBMS GW, BM-SC, Content Providers, and/or PDN Gateway) may be collocated, and may be communicatively coupled wirelessly or through wired communication.

Figure 4:
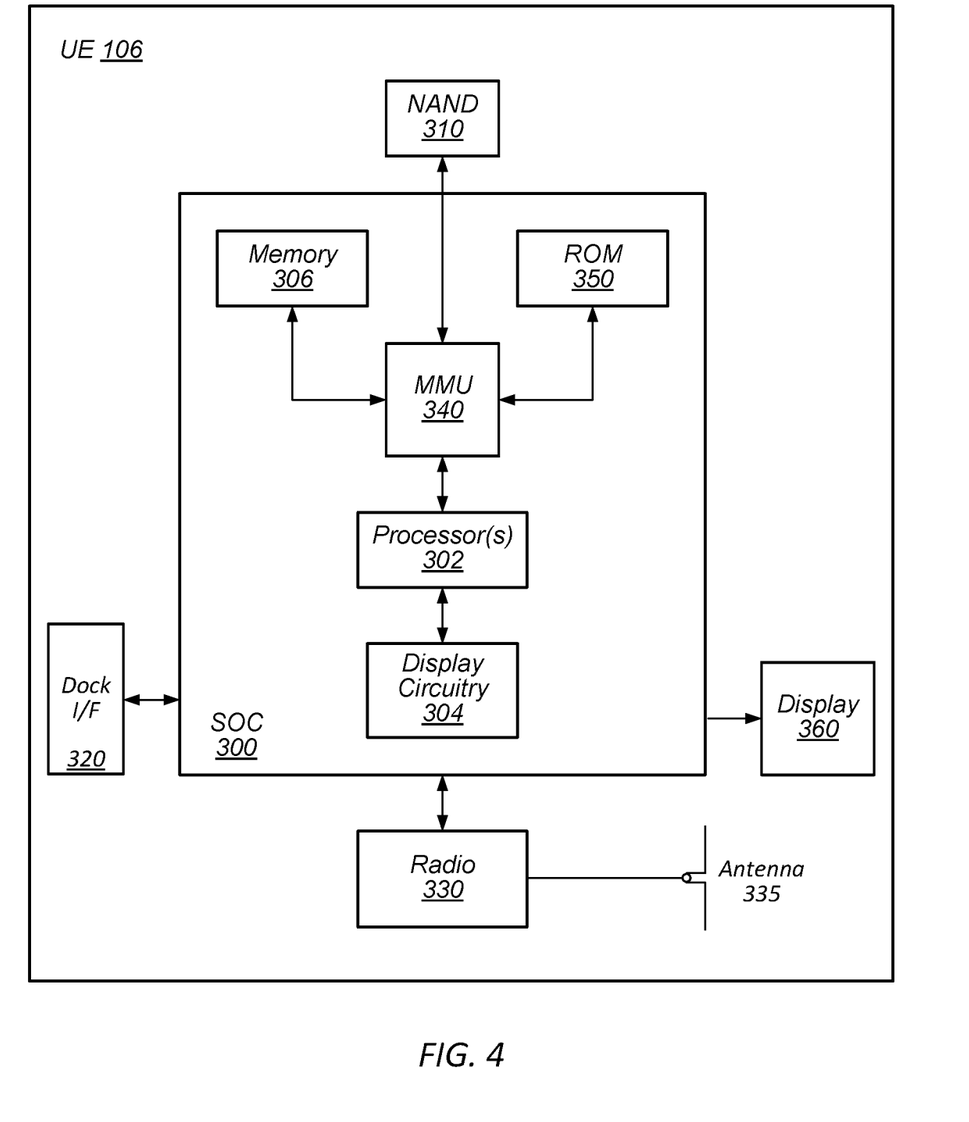
FIG. 4 illustrates an exemplary block diagram of a UE, according to some embodiments.

FIG. 4—Exemplary Block Diagram of a UE

FIG. 4 illustrates an exemplary block diagram of a UE 106, according to some embodiments. As shown, the UE 106 may include a system on chip (SOC) 300, which may include portions for various purposes. For example, as shown, the SOC 300 may include processor(s) 302 that may execute program instructions for the UE 106 and display circuitry 304 that may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna (and possibly multiple antennas, e.g., for MIMO and/or for implementing different wireless communication technologies, among various possibilities) for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features for simultaneous unicast and multicast communications. The UE 106 may be configured to adaptively prioritize simultaneous performance of each of a unicast communication and a multicast communication (such as eMBMS, or another type of multicast communication), such as those described herein with reference to, inter alia, FIG. 6.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 6.

Figure 5:
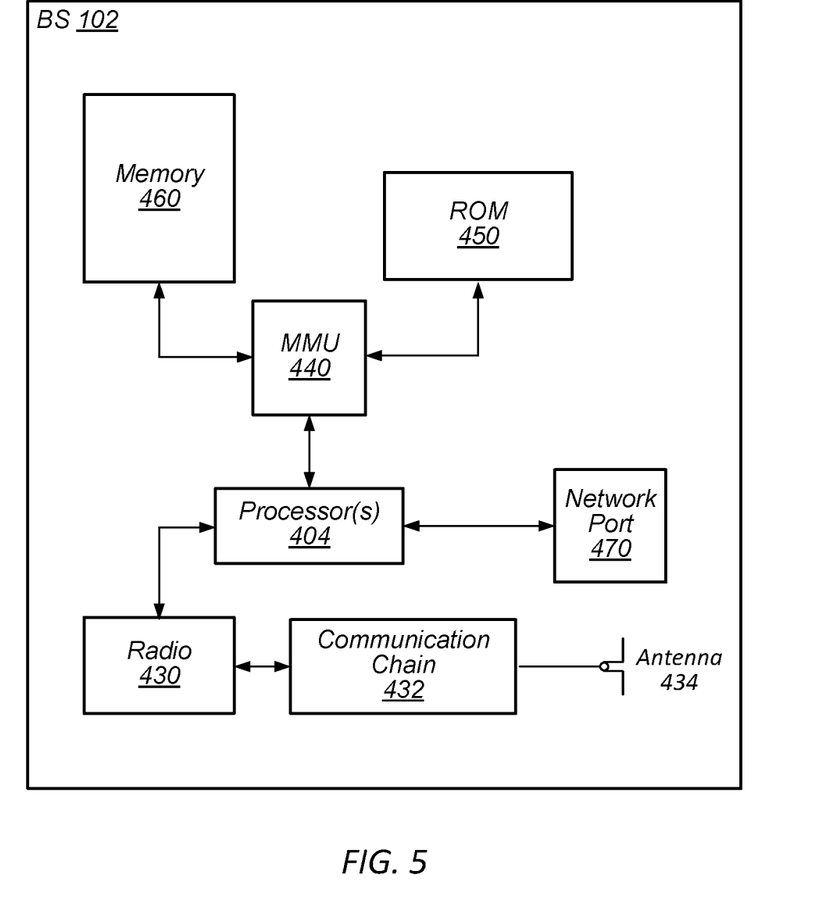
FIG. 5 illustrates an exemplary block diagram of a base station, according to some embodiments.

FIG. 5—Exemplary Block Diagram of a Base Station

FIG. 5 illustrates an example of a base station 102, according to some embodiments. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 using one or both of unicast and multicast communications via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

Enhanced Multimedia Broadcast Multicast Services (eMBMS)

Enhanced multimedia broadcast multicast services, or eMBMS, is a 3GPP technology that allows broadcasting and/or multicasting of data or video to multiple users in a predefined area. For simplicity and concreteness, some embodiments herein are described specifically in terms of the eMBMS protocol. However, it may be appreciated by one of skill in the art that any methods and devices described in terms of eMBMS may be more generally applied to any broadcast and/or multicast communication protocol.

In current implementations, eMBMS may reuse existing LTE network infrastructure. In some embodiments, eMBMS may be transmitted over the air using a specific subframe format, such as multicast control channel (MCCH), or multicast traffic channel (MTCH). In some implementations, eMBMS subframes may be used in up to 60% of overall evolved node B (eNB) transmission occasions.

In existing 3GPP implementations, eMBMS has been designed in order to improve the spectrum usage for the carrier. Typically, eMBMS may operate as follows. A network may detect a number of users that are accessing the same data in the same area. For example, these users may be served through multiple unicast flows containing the data. In order to improve radio resource allocation, if the number of users accessing the same data in the same area is larger than a first threshold, the network may decide to convert these multiple unicast flows into a single multicast flow that could be received by all interested users.

If the number of users (or UEs) consuming the multicast flow drops below a second threshold (which may be the same or different from the first threshold), the network may determine it is no longer advantageous to perform multicast traffic, and the network may stop multicast traffic. In this case, users still interested may be required to create independent unicast flows to obtain the desired content.

During a multicast session the network may determine the allocation mix between multicast subframes and unicast subframes. In some implementations, the multicast ratio may range from 10% to 60% (or another range) depending on current transmission requirements, and the network may typically serve both unicast and multicast/broadcast customers in the area using the same eNBs.

Multicast services are being used with increasing frequency in an increasing number of use cases. There may be many use cases where unicast and multicast services will work in parallel. Hence, it may be desirable for a UE to have prioritization logic to improve the user experience. For example, a UE device with multiple radios may simultaneously engage in both a unicast communication and a multicast communication. Simultaneous unicast (e.g., a carrier aggregation (CA) session, among other possibilities) and multicast (e.g., an eMBMS session, among other possibilities) sessions may cause reduced throughput on the CA session. If the UE is trying to initiate a CA session for high priority data/traffic classes, a poor user experience may result if the multicast session is for a low priority traffic class/background data. As another nonlimiting example, a UE may be receiving a software update via multicast download while the UE is also engaging in a unicast video call. In these cases, simultaneous performance of both the multicast and the unicast communication may adversely affect the performance of one or both of the multicast and/or the unicast communication. Embodiments described below may improve the user experience by providing a mechanism to implement adaptive prioritization of unicast and multicast data transfer.

Applications of eMBMS eMBMS may be employed in a variety of different applications. Broadcast/streaming applications are the main and dominant applications for eMBMS. Broadcasts may be employed at a range of different scales. For example, venue-specific broadcasts may be employed within a sports arena to broadcast content related to an ongoing sports event, such as enhanced coverage with multiple cameras, replays, and relevant statistics. Additionally or alternatively, region-specific broadcasts may be employed in a city or metropolitan area to broadcast content relevant to the city or metropolitan area, such as home team sports games, local events, and local news. As another possibility, eMBMS may be used for nation-wide broadcasts, such as sporting events with national viewership (e.g., the Super Bowl, or the World Series), or other nationally relevant content such as the State of the Union Address. eMBMS may additionally be used to distribute breaking news and urgent public safety announcements (e.g., weather advisories, earthquake notifications, dangerous persons alerts, etc.) at either a venue, regional, or national level of deployment.

In some embodiments, eMBMS may also be used to deliver non-audio/video common content to users. For example, push media, e-publication distributions, and OS/App software distribution may be distributed using eMBMS. These may include daily local updates for "Nearby" and/or "Search" map services (for example, to distribute information related to local events and/or local tourist information), pre-caching of popular new music within a music application installed on a UE device, new shows and featured content pre-caching in the device, local live broadcasting service (e.g., using FaceTime or another application for either enterprise or public use). Depending on the particular application of eMBMS, some changes may be needed to backend systems and/or the network.

In some embodiments, eMBMS may be enabled for OS or application updates. For example, UE devices are typically required to periodically download updates for an operating system (OS) installed on the UE (e.g., iOS™, Android™, or another OS) and/or for various applications installed on the UE. The lengthy delay that can accompany application and/or OS updates and/or installs has been identified as a user experience issue in UE devices. In some embodiments, scheduled OS security updates, carrier bundles, and/or new OS versions updates may be potential data packages for eMBMS. In other embodiments, updates for a particular application that are known by the network to be downloaded on a large number of UEs in a particular broadcast region may be potential data packages for eMBMS. Because these types of updates may be used by most or many users of devices with a particular OS or with a particular application installed within a certain region, radio resources may be more efficiently allocated by broadcasting the update(s)

through multicast. For example, this may save radio resources by not inefficiently transmitting the update(s) through individual unicast transmissions until a threshold number of users are receiving individual unicasts. Rather, the network may determine to initially utilize multicasting and/or broadcasting based on the number of UE devices in a particular region that are anticipated to require the update.

In some embodiments, this may improve the user experience and reduce the delay needed to update the OS and popular Apps. Carriers may also benefit from this feature as it may reduce the number of unicast downloads of the same content, thus reducing radio resource expenditure.

In some embodiments, eMBMS may be enabled for local map updates. For example, a map application (e.g., Apple Maps™, Google Maps™, or another map application) installed on a UE may be configured to update periodically (e.g., daily or weekly, etc.). If a UE enters an area that is serviced by eMBMS, the UE may indicate a preference to receive data packages comprising local map updates that may be sent directly to a map application or POP in the user interface, for example. In various embodiments, the update may be provisioned by a carrier, a cloud service, local administration or third party entities such as a local business.

In some embodiments, eMBMS may be enabled for popular music downloads. For example, a music-related application (e.g., Apple Music™, iTunes™, or another music application) on a UE may periodically display popular new songs and/or albums on a user interface (UI), which a user may want to download. In some embodiments, a user may select a preference to automatically receive data packages of certain popular music files through eMBMS. For example, in some embodiments, streaming of new Hot Tracks, Top 10 and/or Beats-1 radio (or other categories of popular music) may be done over eMBMS. According to a user's selected preference, various categories of new music may be automatically preloaded onto the UE through eMBMS services. In some embodiments, the user may select which of various genres, artists, albums, songs, podcasts and/or categories of music to automatically download through eMBMS. In these embodiments, user experience may be improved and the carrier may more efficiently allocate spectrum usage.

In some embodiments, eMBMS may be enabled for popular video content. For example, users may indicate a preference on their UEs for pre-caching or downloading data packages comprising new or popular TV show, TV series episodes, or other video content. These UEs may be detected within a predefined eMBMS Area, and based on their indicated preferences, popular video content may be pre-loaded through eMBMS services.

Additionally, eMBMS may be enabled for collaborative or distributed learning applications, such as for crowd machine learning (ML) and/or crowd computing. For example, collaborative or distributed learning may be used to employ crowd-sourced machine learning, wherein weights and parameters of a machine-learning algorithm are trained in a distributed manner by a plurality of participating UEs. In these embodiments, eMBMS may be used to efficiently multicast updated parameters of the machine learning model and/or common data to the participating UEs.

In general, any data package that is anticipated to be desired for download by a large number of users may be considered for multicast and/or broadcast distribution, according to various embodiments.

Figure 6:
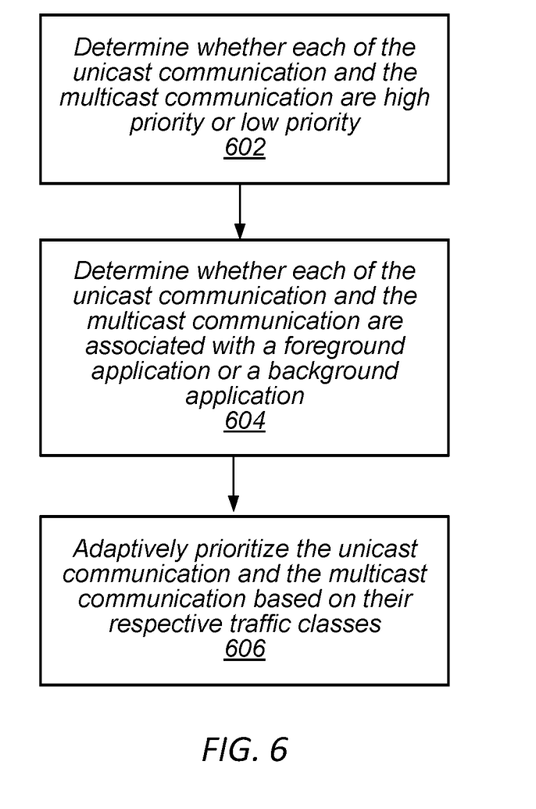
FIG. 6 is a flowchart diagram illustrating an exemplary method for adaptively prioritizing simultaneous unicast and multicast communications, according to some embodiments.

FIG. 6—Adaptively Prioritizing Unicast and Multicast Data Transfer

FIG. 6 is a flowchart diagram illustrating a method for a UE to adaptively prioritize unicast and multicast data transfer based on traffic classes, according to some embodiments. In exemplary embodiments, the unicast data transfer may utilize carrier aggregation to improve data throughput, while the multicast data transfer may utilize MBMS, eMBMS, or another multicast protocol. As described in further detail below, the traffic class of each of the unicast communication and the multicast communication may describe whether the respective communication is associated with a foreground application or a background application, and whether the respective communication is of high priority or low priority. Each of the unicast communication and the multicast communication may be either ongoing or incoming, according to various embodiments. For example, the method described in reference to FIG. 6 may be initiated when a multicast communication is ongoing, and a unicast communication is initiated, or vice versa. In some embodiments, both the unicast communication and the multicast communication are downlink communications. Some of the method elements shown may be performed concurrently, in a different order than shown, or may be omitted. Additional method elements may also be performed as desired. As shown, the method may operate as follows.

At 602, the UE may determine whether each of the unicast communication and the multicast communication are high priority or low priority. The high priority or low priority of each communication may characterize the traffic class of the respective communication. As described herein, a high priority application such as video streaming, a voice call, a video call, or a voice-activated digital assistant (e.g., a Siri application that is initiated by the user saying "Hey Siri", or another voice-activated digital assistant) may refer to an application with strict latency requirements relative to a low priority application. For example, a video call may be very sensitive to latency, in that delay in the video call may adversely affect the user experience. As another example, signaling/control traffic may be of high priority, as latency may adversely affect the ability of the signaling/control traffic to effectively direct subsequent communications. In contrast, a low priority application may refer to an application with relatively lesser latency requirements. For example, latency may be introduced into the sending and/or receiving of emails in an email application, or text messages in a texting application (e.g., iMessage or another texting application), without adversely affecting the user experience. The priority of a communication may further specify a type of service provided by the application, in some embodiments. For example, it may be determined that an application associated with a unicast communication is high priority and is a video calling application (e.g., FaceTime, or another video calling application). Thus, the communication (whether unicast or multicast) associated with a high priority application may be considered "high priority communication" and the communication associated with a low priority application may be considered "low priority communication".

It may be understood that the scope of the embodiments described may encompass a variety of definitions of "high priority" and "low priority". For example, different embodiments may employ different cutoffs for the latency requirements of an application that delineate between low and high priority. However, it may be generally understood that high priority applications may be more sensitive to latency, while low priority applications may be correspondingly less sensitive to latency, among other possible factors.

At 604, the UE may determine whether each of the unicast communication and the multicast communication are associated with a foreground application or a background application. Whether each communication is associated with a foreground or background application may further characterize the traffic class of the respective communication (e.g., in addition to the priority level of the communication). Thus, communication (whether unicast or multicast) associated with a foreground application may be considered "foreground communication" and communication (whether unicast or multicast) associated with a background application may be considered "background communication". As described herein, a foreground application may be understood to be an application that is currently running on the UE as a result of user initiation of the application, and/or an application that is currently displayed on a display of the UE. For example, if a user makes a selection to run an email application of the UE and the email application is displayed on the UE display, the email application may be considered a foreground application. In contrast, a background application may be understood to be an application that is currently running on the UE independent of user initiation (e.g., the background application may be configured to run at preset intervals without requiring user initiation), and/or an application that is not currently displayed on a display of the UE. For example, if a UE is configured to periodically run a software update application at a particular frequency or at a particular time of day, and the update application runs in the background without being actively displayed on the display of the UE, the update application may be considered to be a background application. As another example, the email application previously described, when no longer active (e.g., when the user has switched away from the email application) may continue to operate as a background application and may check for incoming emails periodically.

At 606, the UE may adaptively prioritize one of the unicast communication and the multicast communication over the other based on their respective traffic classes. "Prioritizing" either the multicast communication or the unicast communication as described herein may imply any of several types of preferential treatment for the prioritized communication. It is to be understood that prioritization of unicast or multicast communication is distinct from the "high priority" or "low priority" associated with the communications (although, in some embodiments, the prioritization decision may be based at least in part on whether the communications are high priority or low priority). As described herein, the communication (either unicast or multicast) which is given preferential treatment is equivalently described as the prioritized communication and/or as the more preferred communication.

As described above, the traffic class of each of the unicast communication and the multicast communication may specify whether the respective communication is associated with a foreground application or a background application, and whether the respective communication is of high priority or low priority. Based on the traffic class of each of the unicast and multicast communication, and as explained in further detail below, the UE may adaptively prioritize the communications by pausing or buffering the less preferred communication for a period of time for later reception, and performing the more preferred communication first. Buffering one of the (unicast or multicast) communications may advantageously improve or maintain throughput performance for the other communication (multicast or unicast). Alternatively, rather than simply buffering the communication, the less preferred communication may be allowed to continue to operate, but with lower or reduced throughput, while the preferred communication may be performed with normal throughput (i.e., in some embodiments, the preferred communication may be configured to have a higher throughput than the less preferred communication, through allocating a larger number of component carriers to the preferred communication, for example). In these embodiments, the less preferred communication may be prevented from competing with radio resources of the more preferred communication to a degree that may adversely affect the user experience. In some embodiments, the decision of whether to buffer or reduce throughput for the less preferred communication may depend on any of various factors, e.g., whether the less preferred communication is foreground or background, whether it is high or low priority, the signal quality of communication, the available throughput, etc.

FIG. 7 is a table that summarizes the conditions upon which either a unicast or multicast communication may be preferred, according to some embodiments. These specific conditions are discussed in further detail in the following paragraphs.

In some embodiments, it may be determined that one of the unicast or multicast communication is high priority and the other is low priority. In these embodiments, the UE may prefer the high priority communication. In other words, the UE may buffer the low priority communication, perform the low priority communication at a lower bandwidth, schedule the high priority communication over a higher bandwidth carrier, and/or allocate additional component carriers to the high priority communication to increase throughput. In these embodiments, the UE may determine which communication to prioritize regardless of whether the communication is associated with a foreground or background application, and regardless of whether the communication is unicast or multicast.

For example, if a UE has a stock ticker application in the foreground that is updating via unicast (low priority), and the UE is simultaneously displaying a video sports event that is being downloaded via multicast communications (high priority), the user experience may be improved if the stock ticker updates are buffered (or switched to be performed over a low bandwidth carrier) to reserve radio and computational resources for the multicast sports video. As another example, a music application may be streaming music via unicast in the background (high priority), while simultaneously a file (e.g., a movie file or another file) may be downloading via multicast in the foreground (low priority). In this example, latency in downloading the file may not be as noticeable to the user of the UE, and the user experience may be improved by buffering (or lowering the throughput of) the file download and performing the music streaming at full throughput. For example, the unicast communication may employ carrier aggregation (CA), and throughput performance may be maintained or improved if all available component carriers are allocated to the unicast communication, and the multicast session is buffered until completion of the unicast session. As one specific example, the eMBMS service layer may disable reception of the multicast session for the duration of the unicast high priority session, so that the UE is able to allocate all subframes, previously used for the multicast session, for the unicast downlink activity. Once the unicast session is complete, the multicast session may resume activity.

In some embodiments, it may be determined that the unicast communication and the multicast communication are both of either high priority or low priority, and it may further be determined that one of the unicast or multicast communications is associated with a foreground application while the other is associated with a background application. In these embodiments, the UE may prefer the foreground communication over the background communication, regardless of which communication is multicast versus unicast.

In some embodiments, it may be determined that the unicast communication and the multicast communication have the same priority, and it may be further determined that the unicast communication and the multicast communication are both associated with a respective background application. In these embodiments, the UE may prefer the multicast communication over the unicast communication. Background multicast sessions are typically of higher importance than background unicast sessions. For example, a software update may be downloaded via multicast in the background, and it may be important to the user to have software updates installed in a timely fashion. On the other hand, a stock monitoring application may update in the background via unicast, and it may be less important to the user experience to have stock prices updated in a timely fashion while in the background. Background multicast sessions are typically downloaded by a large number of UEs (hence the advantage of distributing the content via multicasting), such that the content of the background multicast session may often be more important than a concurrent background unicast session. For at least these reasons, the user experience may be improved by preferring background multicast sessions over background unicast sessions. In these embodiments, the UE may buffer the unicast communication for a first period of time and perform the multicast communication. Alternatively or in addition, the UE may continue the unicast communication at a reduced throughput, and/or may schedule the multicast communication over a higher bandwidth carrier. For example, the UE may report a lower CQI to the serving unicast cell, which may reduce throughput of the unicast session. As another example, a particular multicast broadcast single frequency network (MBSFN) may support multiple downlink frequencies, and the UE may switch the frequency used for multicast downlink from a first frequency with a lower bandwidth to a second frequency with a higher bandwidth using an eMBMS interest indication framework. Additionally or alternatively, in the data processing buffer, the baseband may prioritize the multicast session data over the unicast session data, for example.

In some embodiments, it may be determined that the unicast communication and the multicast communication are both associated with a respective foreground application, and it may be further determined that both the unicast communication and the multicast communication have the same priority. For example, a user may be conducting a video call via unicast (high priority) while also watching a live sports video that is received via multicast (high priority). In these embodiments, the user experience may be adversely affected if the foreground multicast-associated application is preferred over the unicast video calling application. As such, in these embodiments, the UE may prefer the unicast communication over the multicast communication. Unicast communications that operate in the foreground are often initiated directly in response to user input, and it may be important to the user that the foreground unicast communications are completed in timely fashion. Because unicast communications typically correspond to UE-specific content, while multicast communications typically correspond to content that is generic to a plurality of UEs, timely reception of foreground unicast communications may often be more important to the user experience than foreground multicast communications. As such, the user experience may be improved by preferring the foreground unicast communication over the foreground multicast communication. In these embodiments, the multicast communication may be buffered for a first period of time and the unicast communication may be performed (potentially with increased throughput). The first period of time may extend until the termination of the video calling application, or it may be another predetermined period of time. If the unicast communication employs carrier aggregation, additional component carrier(s) (e.g., the component carrier(s) that would be allocated to the multicast communication) may be allocated to increase the throughput of the unicast communication.

In some embodiments, the preferred communication may be determined further based on the type of application associated with the communication. For example, where there is a tie in priority of communication (e.g., if both are high priority or low priority), there may be a preference among the types of applications in determining which communication is preferred. Because the user experience of a video call is particularly sensitive to latency, a video call may be preferred over a high priority multicast communication.

In some embodiments, when the multicast communication is preferred over the unicast communication, additional method steps may be performed to further improve the performance of the multicast communication. For example, in addition to buffering the unicast communication (or using a lower throughput), the multicast communication may be routed through a carrier with a higher bandwidth. For example, a UE may be configured with multiple component carriers (e.g., a primary component carrier, PCC, and a secondary component carrier, SCC), and the multiple carriers may have different bandwidths. As one nonlimiting example, the UE may be configured with a PCC with a 5 MHz bandwidth and an SCC with a 20 MHz bandwidth. In these embodiments, the preferred multicast service may be routed to the higher bandwidth carrier. For example, the UE may initiate an MBMS interest indication procedure and route the multicast service on the SCC.

In some embodiments, the UE may determine that the UE does not support multicast communications on an SCC which has a higher bandwidth than the serving PCC. If it is determined that the UE doesn't support multicast services on an SCC, the UE may, in response, perform a handover (HO) procedure to a PCC on a neighboring cell with a higher bandwidth than the PCC of the serving cell of the UE.

Similarly, the UE may be configured to select different RATs to provide a different experience. For example, available RATs (e.g., cellular RAT or WLAN RAT) may have different latency, bandwidth, and/or other characteristics and the particular RAT for each communication may be selected based on those characteristics. For example, a foreground application having relatively low data that is latency sensitive might use a cellular connection with good connection quality, but a background application with relatively high data but low latency sensitivity (e.g., a software update) might use a WLAN connection. Any of the considerations discussed above may be used in selecting the appropriate RAT for the unicast or multicast communication(s).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A user equipment device (UE) configured to simultaneously perform a unicast communication and a multicast communication, the UE comprising:
   a radio, comprising an antenna configured for wireless communication;
   a processing element operably coupled to the radio;
   wherein the processing element and the radio are configured to:
      determine whether each of the unicast communication and the multicast communication are high priority or low priority;
      determine whether each of the unicast communication and the multicast communication are associated with a respective foreground application or a respective background application;
   and
      based on a determination that the unicast communication and the multicast communication have the same priority, and further based on a determination that the unicast communication and the multicast communication are each associated with their respective background application, prioritize the multicast communication over the unicast communication.

2. The UE of claim 1,
   wherein prioritizing the multicast communication over the unicast communication comprises buffering the unicast communication, and routing the multicast communication through a secondary component carrier (SCC) with a higher bandwidth than a primary component carrier (PCC).

3. The UE of claim 1, wherein in prioritizing the multicast communication over the unicast communication, the processing element and the radio are further configured to:
   determine that the UE does not support multicast communications on a secondary component carrier (SCC);
   in response to determining that the UE does not support multicast communications on the SCC, perform a handover procedure to a primary component carrier (PCC) on a neighboring cell of the UE with a higher bandwidth than a PCC of a serving cell of the UE; and
   perform the multicast communication on the PCC of the neighboring cell.

4. The UE of claim 1, wherein the processing element and the radio are further configured to:
   based on a determination that one of the unicast communication and the multicast communication is high priority and the other is low priority, prioritize the high priority communication, wherein the high priority communication is prioritized regardless of whether it is associated with its respective foreground application or background application.

5. The UE of claim 4,
   wherein the high priority communication is the unicast communication, and wherein in prioritizing the unicast communication over the multicast communication, the processing element and the radio are configured to:
   buffer the multicast communication for the duration of the unicast communication;
   allocate one or more component carriers associated with the multicast communication to the unicast communication; and
   perform the unicast communication.

6. The UE of claim 1, wherein the processing element and the radio are further configured to:
   based on a determination that the unicast communication and the multicast communication are both either high priority or low priority, and further based on a determination that one of the unicast communication and the multicast communication is associated with its respective foreground application and the other is associated with its respective background application, prioritize the communication associated with the respective foreground application.

7. The UE of claim 1, wherein the multicast communication is an enhanced multimedia broadcast multicast services (eMBMS) communication.

8. A user equipment device (UE) configured to simultaneously perform a unicast communication and a multicast communication, comprising:
   a radio, comprising an antenna configured for wireless communication;
   a processing element operably coupled to the radio;
   wherein the processing element and the radio are configured to:
      determine whether each of the unicast communication and the multicast communication are high priority or low priority;
      determine whether each of the unicast communication and the multicast communication are associated with a respective foreground application or a respective background application; and
      based on a determination that the unicast communication and the multicast communication have the same priority, and further based on a determination that the unicast communication and the multicast communication are each associated with their respective foreground application, prioritize the unicast communication over the multicast communication.

9. The UE of claim 8,
wherein in prioritizing the unicast communication over the multicast communication, the processing element and the radio are configured to:
buffer the multicast communication;
allocate one or more component carriers associated with the multicast communication to the unicast communication; and
perform the unicast communication.

10. The UE of claim 9,
wherein the multicast communication is buffered until the completion of the unicast communication.

11. The UE of claim 8, wherein the processing element and the radio are further configured to:
determine that unicast communication is associated with a video calling application;
based on a determination that the unicast communication is associated with a video calling application, that the unicast communication and the multicast communication are each associated with their respective foreground application, and that the unicast communication and the multicast communication have high priority, prioritize the unicast communication over the multicast communication.

12. The UE of claim 8, wherein the processing element and the radio are further configured to:
based on a determination that one of the unicast communication and the multicast communication is high priority and the other is low priority, prioritize the high priority communication, wherein the high priority communication is prioritized regardless of whether it is associated with its respective foreground application or background application.

13. The UE of claim 12, wherein the high priority communication is the multicast communication, and wherein in prioritizing the multicast communication over the unicast communication, the processing element and the radio are further configured to:
determine that the UE does not support multicast communications on a secondary component carrier (SCC);
in response to determining that the UE does not support multicast communications on the SCC, perform a handover procedure to a primary component carrier (PCC) on a neighboring cell of the UE with a higher bandwidth than a PCC of a serving cell of the UE; and
perform the multicast communication on the PCC of the neighboring cell.

14. The UE of claim 8, wherein the multicast communication is an enhanced multimedia broadcast multicast services (eMBMS) communication.

15. The UE of claim 8, wherein the processing element and the radio are further configured to:
based on a determination that both the unicast communication and the multicast communication have the same priority, and further based on a determination that one of the unicast communication and multicast communication is associated with its respective foreground application, and the other is associated with its respective background application, prioritize the communication that is associated with the respective foreground application.

16. A method for operating a user equipment device (UE) to simultaneously perform a unicast communication and a multicast communication, the method comprising:
determining whether each of the unicast communication and the multicast communication are high priority or low priority;
determining whether each of the unicast communication and the multicast communication are associated with a respective foreground application or a respective background application; and
based on the determination whether each of the unicast communication and the multicast communication are high priority or low priority, and further based on the determination whether each of the unicast communication and the multicast communication are each associated with the respective foreground application or the respective background application, prioritizing one of the unicast communication or the multicast communication over other.

17. The method of claim 16,
wherein prioritizing one of the unicast communication or the multicast communication over other comprises prioritizing the unicast communication over the multicast communication based on a determination that both the unicast communication and the multicast communication are associated with respective foreground applications.

18. The method of claim 17,
wherein said prioritizing the unicast communication over the multicast communication is further based on a determination that the unicast communication has an equal or higher priority than the multicast communication.

19. The method of claim 16,
wherein prioritizing one of the unicast communication or the multicast communication over other comprises prioritizing the multicast communication over the unicast communication based on a determination that both the unicast communication and the multicast communication are associated with respective background applications.

20. The method of claim 19,
wherein said prioritizing the multicast communication over the multicast communication is further based on a determination that the multicast communication has an equal or higher priority than the unicast communication.

* * * * *